United States Patent [19]
Oglesbee et al.

[11] Patent Number: 6,127,804
[45] Date of Patent: Oct. 3, 2000

[54] LITHIUM ION CHARGING MEANS AND METHOD USING IONIC RELAXATION CONTROL

[76] Inventors: John Wendell Oglesbee, 1101 Fernwood Dr., Watkinsville, Ga. 30677; Michael D. Geren, 765 Treadstone Ct., Suwanee, Ga. 30024; John Edward Herrmann, 875 Lawrenceville-Suwanee Rd., Suite 310-228, Lawrenceville, Ga. 30043

[21] Appl. No.: 09/393,478
[22] Filed: Sep. 10, 1999
[51] Int. Cl.[7] ................ H01M 10/44; H01M 10/46
[52] U.S. Cl. ............................... 320/125; 320/160
[58] Field of Search ...................... 320/100, 127, 320/128, 129, 130, 160, 157, 125, FOR 118, FOR 119, FOR 120, FOR 121

[56] References Cited

U.S. PATENT DOCUMENTS

| | | |
|---|---|---|
| 5,596,259 | 1/1997 | Mino et al. |
| 5,828,202 | 10/1998 | Tamai .................................. 320/141 |
| 5,905,364 | 5/1999 | Ookita .................................. 320/141 |

*Primary Examiner*—Edward H. Tso

[57] ABSTRACT

This invention combines linear charging techniques with ionic relaxation pulse charging to rapidly charge lithium ion batteries to full capacity. The preferred embodiment incorporates a blocking diode and series resistor to multiplex an ionic relaxation control circuit with a linear regulated charging circuit, thereby utilizing a single, common, shared power transistor.

9 Claims, 4 Drawing Sheets

LITHIUM ION CHARGING MEANS AND METHOD USING IONIC RELAXATION CONTROL

TECHNICAL FIELD

The present invention relates generally to rapid charging of lithium based rechargeable batteries.

BACKGROUND

The demand for portable consumer products with rechargeable batteries is extremely high and the marketplace for these types of products is highly competitive. Due to competitive pressure, manufacturers of portable electronic devices, including manufacturers of power supplies and chargers, are constantly looking for high quality, low cost designs. In some cases, product performance is sacrificed as cost reduction pressure is an overriding constraint.

Many low cost chargers are of the "ON/OFF" variety. They are so named because the output power is either fully on or fully off. ON/OFF chargers generally are capable of producing a specified output voltage with a current limit. In other words, the charger delivers a pre-determined voltage while limiting the maximum available current, and thus the maximum power that can be delivered.

Even less expensive chargers use systems where the power that can be delivered is limited only by the charger's source impedance. Here the voltage decreases as current increases, in a linear fashion. The output characteristics of such chargers can be seen in FIG. 1. These types of supplies, ON/OFF current limited and ON/OFF impedance limited, are very popular due to their low cost.

Such low cost designs are generally adequate in performance for nickel based battery systems, including nickel-cadmium and nickel-metal hydride. Nickel based batteries can be successfully charged over a wide range of charging currents while retaining much of the energy delivered by the charger as stored cell energy. It is typical for a battery cell to retain 80 to 90% of the delivered energy when using either a ON/OFF current limited or an ON/OFF impedance limited charger.

Much more efficient charging, however, can be obtained when a "top-off charge" feature is added. Top-off charge refers to the process of supplying the battery cell with small amounts of energy when a termination voltage is reached. In ON/OFF chargers, this is accomplished by rapidly turning the charger on and off, or pulsing the charger in the on mode and thereby delivering bursts of energy to the battery. Nearly 100% charge capability is obtainable in nickel systems using this method.

The problem associated with ON/OFF designs is that they are not compatible with lithium based batteries like lithium-ion and lithium polymer. Lithium based batteries have traditionally required constant current—constant voltage chargers. Constant current—constant voltage chargers work as follows: when a battery is discharged, the voltage dips to a low value, 3 volts for example. When the discharged battery is connected to a constant current—constant voltage charger, the charger initially charges at a constant current, 1 amp for example, until the voltage of the battery rises to a preset termination point, 4 volts for example. The charger then reduces the current and continues to charge the battery at a constant voltage which is the termination voltage. Hence the constant current—constant voltage name. ON/OFF chargers are not compatible with lithium batteries because they are not able to reduce the current at the constant termination voltage. It is therefore difficult to design multiple chemistry, i.e. lithium compatible and nickel compatible, chargers with the ON/OFF topology.

A compromise charging system for lithium batteries can be found using an ON/OFF charger. The charger charges in the ON/OFF mode until the lithium termination voltage is reached. Once the termination is reached, the ON/OFF switch electrically disconnects the charger from the battery. The drawback to this method is that lithium cells only get charged to about 80% of their capacity.

There is therefore a need for an inexpensive charger that can rapidly charge both nickel based and lithium based batteries.

SUMMARY OF THE INVENTION

Ionic relaxation charging techniques provide a means of rapidly charging lithium ion batteries. The drawback of this method is that batteries can only be charge to approximately 90% of capacity.

Linear regulated charging techniques, on the other hand, charge lithium ion batteries to 100% capacity but are much slower than ionic relaxation techniques. This invention overcomes both the problem of capacity associated with ionic relaxation charging and the problem of time associated with linear regulated charging. The invention combines linear charging and ionic relaxation charging to create a rapid, full capacity charger.

The invention further reduces costs in the preferred embodiment by utilizing a single, common, shared power transistor.

DETAILED DESCRIPTION OF THE INVENTION

Figure 1:
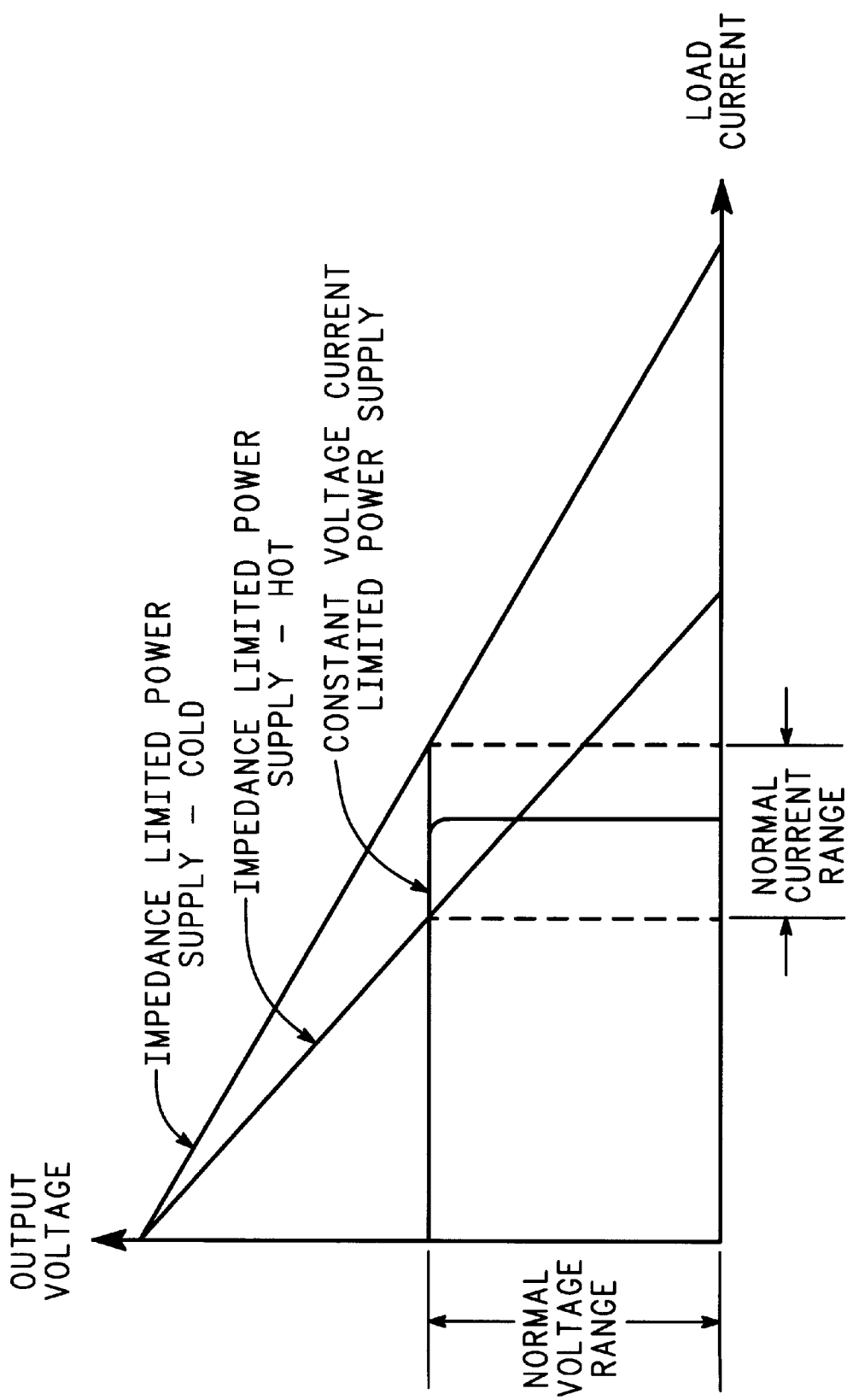
FIG. 1 illustrates the output of various traditional power supplies.

The notion of "ionic relaxation" regarding rapidly charging batteries is well known and has been described in the art of battery charging. In fact, "pulse" chargers, such as the charging circuits described in U.S. Pat. No. 5,596,259, Mino et al., U.S. Pat. No. 5,828,202, Tamai, and U.S. Pat. No. 5,905,364, Ookita, take advantage of the ionic relaxation phenomena in order to rapidly charge batteries. For reference, a brief description of ionic relaxation is provided here:

Without being bound by theory, in Lithium Ion batteries the active particles which convert chemical energy to electrical energy are called ions. When a rechargeable lithium ion battery has been at rest for some time, i.e. with no charger and no load attached, it is understood that the ions become evenly dispersed throughout the cell. Evenly dispersed refers to a state where the electric field is evenly distributed, resulting in an electric field gradient of zero across the cell. This state may be referred to as "ionic rest" as there is no migration of ions within the cell.

When an external voltage, current, or load is applied to a cell, the electric field gradient is disturbed and the ions migrate to accommodate the new external terminal voltage requirements. This state may be referred to as "ionic agitation". Ionic agitation is analogous to poking a stick into a hornets nest, with the stick representing the external stimulus and the hornets representing ions.

When the external voltage, current or load is removed from the cell, the cell begins to return to the state of ionic rest. This return process from agitation to rest is called "ionic relaxation". The rate at which the cell "relaxes" may be approximated mathematically as an exponential decay in the form $T=Ce^{-kt}$, where C is a constant proportional to degree of agitation, t is time, and e is the exponential function. The term k is a constant and may be referred to as the ionic relaxation time constant. It is related to the rate of ionic mobility of the ions in the electrolyte of the cell. Typically, the time required for relaxation under a normal stimulus is somewhere between 30 and 300 seconds.

Ionic relaxation impacts a cell when charging. When a cell is being charged at a high rate, the voltage increases as the cell absorbs energy. If the charge current is suddenly interrupted, the cell voltage drops a certain amount almost instantly due to an equivalent impedance within the cell. Following the initial drop, the cell voltage will continue to drop exponentially until a lower steady state voltage is reached. This exponential decay is a result of ionic relaxation.

In a similar fashion, when charge current is applied to the cell, the voltage instantaneously increases due to the equivalent series resistance. This initial jump is followed by an exponential increase in voltage due to ionic agitation. These "small signal", exponential, voltage swings are superimposed upon a slower, more linear "large signal" voltage increase that is increased and decreased by energy storage and discharge within the cell.

In addition to energy storage, ionic agitation and relaxation cause resistance and inefficiency when charging cells. When ions are aligning themselves due to energy storage, they "bump into each other" along the way. This interference generates heat and unwanted gas. In order to rapidly charge a battery, one tries to align ions as rapidly as possibly while reducing the incidents of inefficient collisions.

Charging a battery is similar, and thus may be visualized as filling a mug with root beer. Imagine that the mug is the battery, root beer is energy, and the foamy head is an undesirable increase in cell voltage and impedance caused by inefficient agitation. The goal is to fill the glass with root beer as quickly as possible, i.e. fast "charging", without any of the foamy head overflowing the mug. Pouring in one continuous stream is the same as charging a battery with a constant current (as with an ON/OFF type charger), and it generates a substantial amount of head. If, however, one puts in a little root beer and waits for the head to disappear (i.e. allow ionic relaxation to take place), then puts in another burst and so on, the glass can be filled (or battery can be charged) much more quickly. This is the motivation behind pulse charging in order to rapidly charge batteries.

Figure 2:
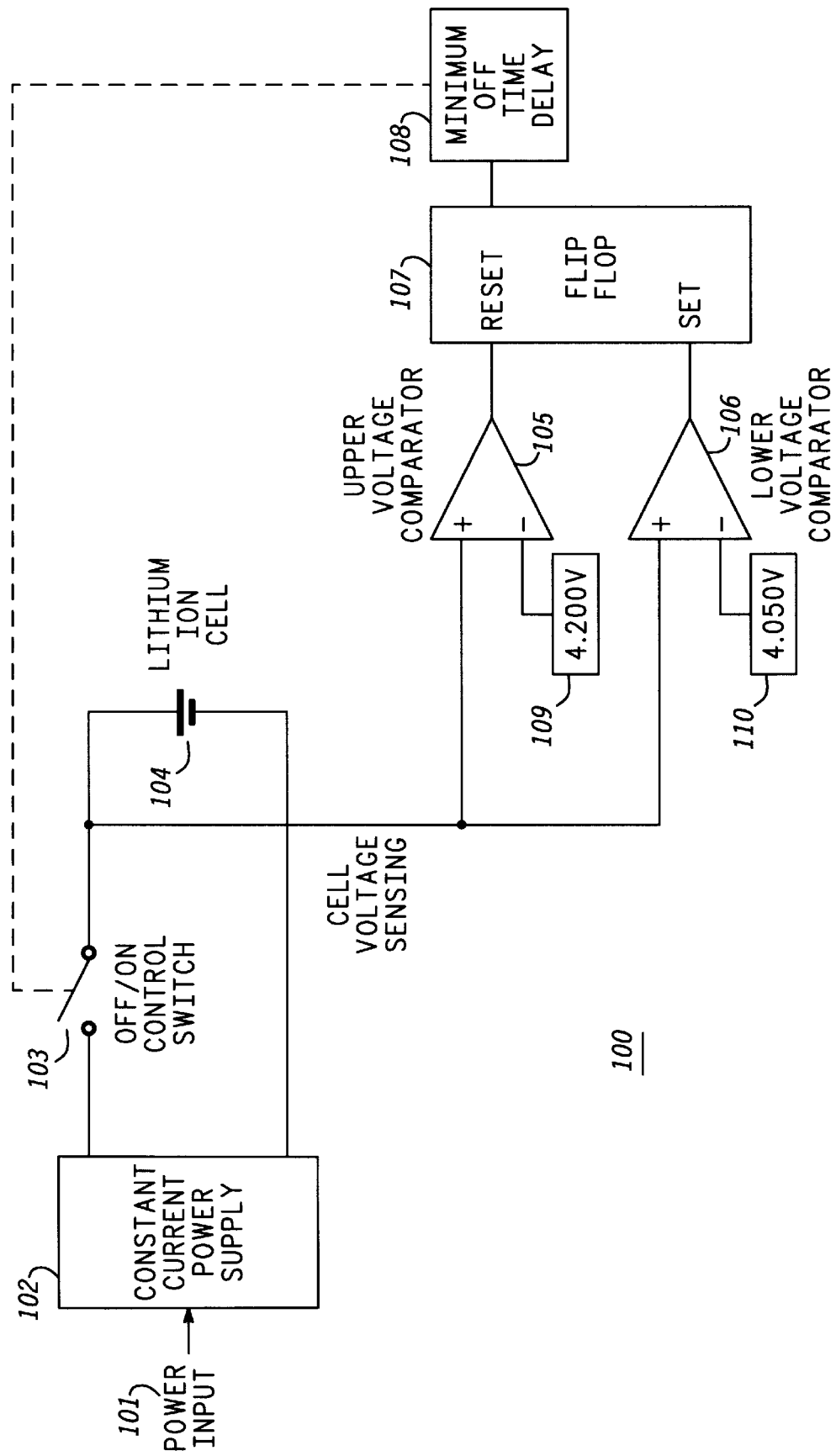
FIG. 2 illustrates an ionic relaxation control system.

Referring now to FIG. 2, an ionic relaxation charging system 100 is shown. A constant current power supply 102 with a power input 101 is coupled to a lithium ion cell 104 through a series ON/OFF control switch 103. The voltage of the lithium ion cell 104 is sensed by both an upper voltage comparator 105 and a lower voltage comparator 106. These comparators 105 and 106 compare the cell voltage to an upper voltage reference 109 and a lower voltage reference 110.

When the cell voltage is below the lower voltage reference 110, the lower voltage comparator 106 output sets the S/R flip flop 107 to close the ON/OFF control switch 103. The system 100 thus commences charging. A minimum off time delay module 108 is added to ensure a sufficient minimum time for ionic relaxation has passed. When the cell voltage reaches that of the upper voltage reference 109, the upper voltage comparator 105 resets the S/R flip flop 107 to open the ON/OFF control switch 103, stop charging and allow for ionic relaxation. The system 100 stays off until the cell voltage drops below the lower voltage reference 110 and the charging procedure begins anew.

A similar system for pulse charging has been described in U.S. Pat. No. 5,905,364, Ookita. The pulse process is very effective for rapidly charging batteries. A practical limitation of the above described system is the system only charges lithium cells to about 90% of capacity.

Figure 3:
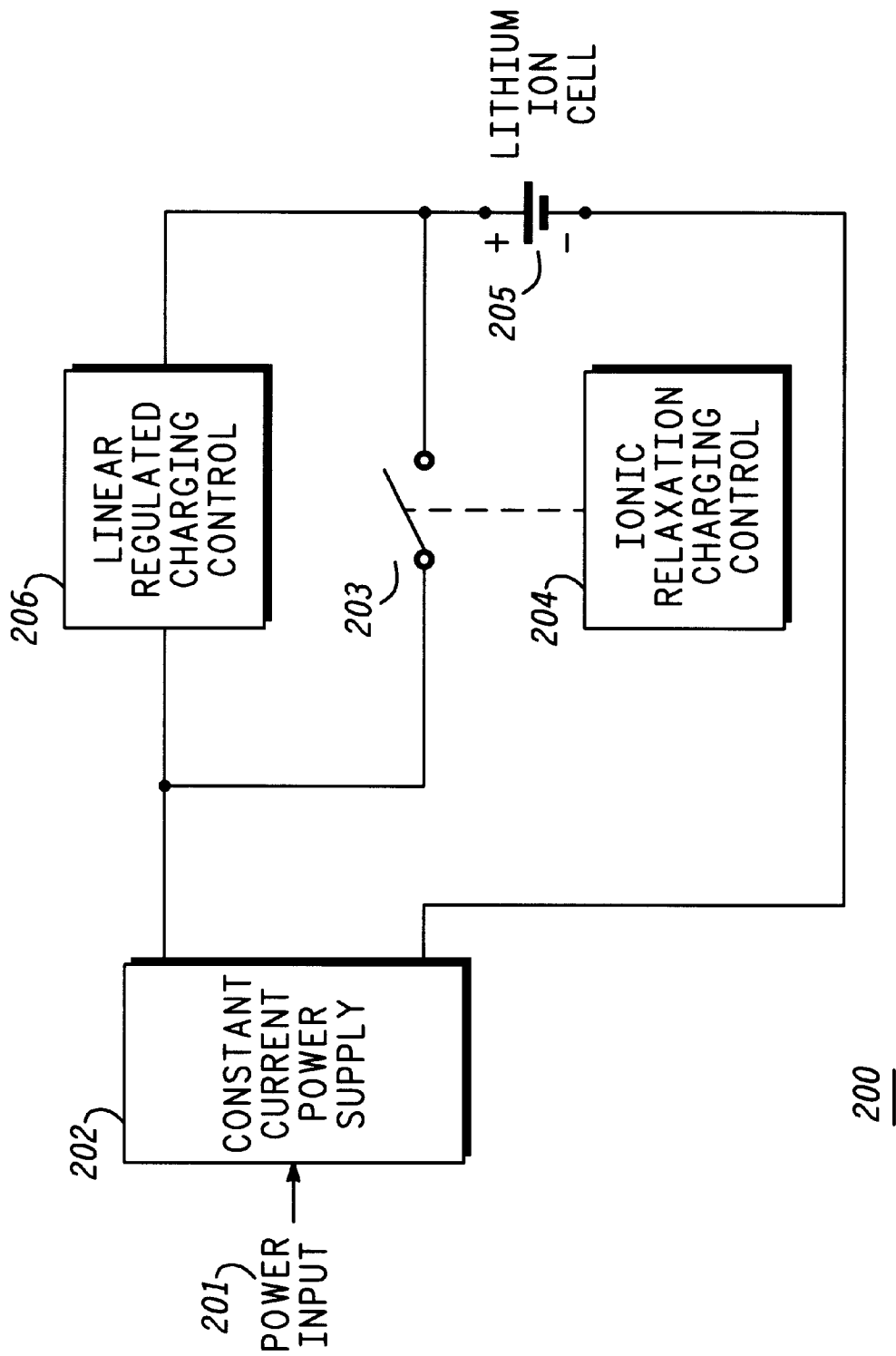
FIG. 3 illustrates an embodiment of the present invention.

Referring now to FIG. 3, the present invention, an improved ionic relaxation charger 200, is shown. Illustrated therein are the power input 201 for supplying power, the constant current power supply 202 for regulating power, the ON/OFF switch 203 for starting and stopping power, and lithium ion cell 205. The ionic relaxation charging control 204 is representative of the collective circuit of FIG. 2, including the upper voltage comparator 105, lower voltage comparator 106, upper voltage reference 109, lower voltage reference 110, S/R flip flop 107, and minimum off time delay 108 found in FIG. 2. The circuit in FIG. 3 includes the addition of linear regulated charging control 206.

The linear regulated charging control 202 can be any one of the wide variety of circuits that have been used in lithium charging systems. The linear regulated charging control 202 provides a constant minimum voltage and limited current to the lithium ion cell 205 until charging is complete. The linear regulated charging control 202, in combination with the physical characteristics of the cell, cause the current to decrease as the lithium ion 205 cell charges to 100% of capacity.

The present invention can be designed to work in one of two ways: In a first mode, when a lithium ion cell 205 is attached, the ionic relaxation charging control 204 charges the lithium ion cell 205 rapidly until the termination voltage is reached. Once termination voltage is reached, the ON/OFF switch 203 is turned off and the linear regulated charging control 202 finishes charging the lithium ion cell 202. By using this system 200, lithium ion cells can be charged to 100% capacity in less time than traditional chargers.

In a second, and preferred, mode, when the lithium ion cell 205 is attached, the ionic relaxation charging control 204 charges the lithium ion cell 205 rapidly until the termination voltage is reached. At this point, the ionic relaxation charging control 204 of the ON/OFF switch 203 transfers to the linear mode, whereby the cell 205 is charged in a linear fashion, at a relatively low current. As ionic relaxation takes place, the voltage of the cell drops. When a lower threshold is reached, the ionic relaxation charging control 204 of the ON/OFF switch 203 reverts back to a rapid mode and again charges the cell 205 at a high current until the termination voltage is reached. This cycle repeats itself until the cell voltage no longer falls to a lower threshold. In this state, linear charging continues to take place until the cell is fully charged.

The second mode, illustrated above, is the preferred mode in that the charging time is greatly reduced over that of the first mode. This is due to the fact that a low charge current is present between pulses of rapid charge. It is the presence of the charge current, along with cyclic pulses of rapid charge, that reduces the time necessary for full capacity charging.

The problem with this circuit is that the ON/OFF switch 203 generally comprises a power transistor rated for high currents. The linear regulated charging control 202 also uses a power transistor. These transistors represent a significant cost of the system.

Figure 4:
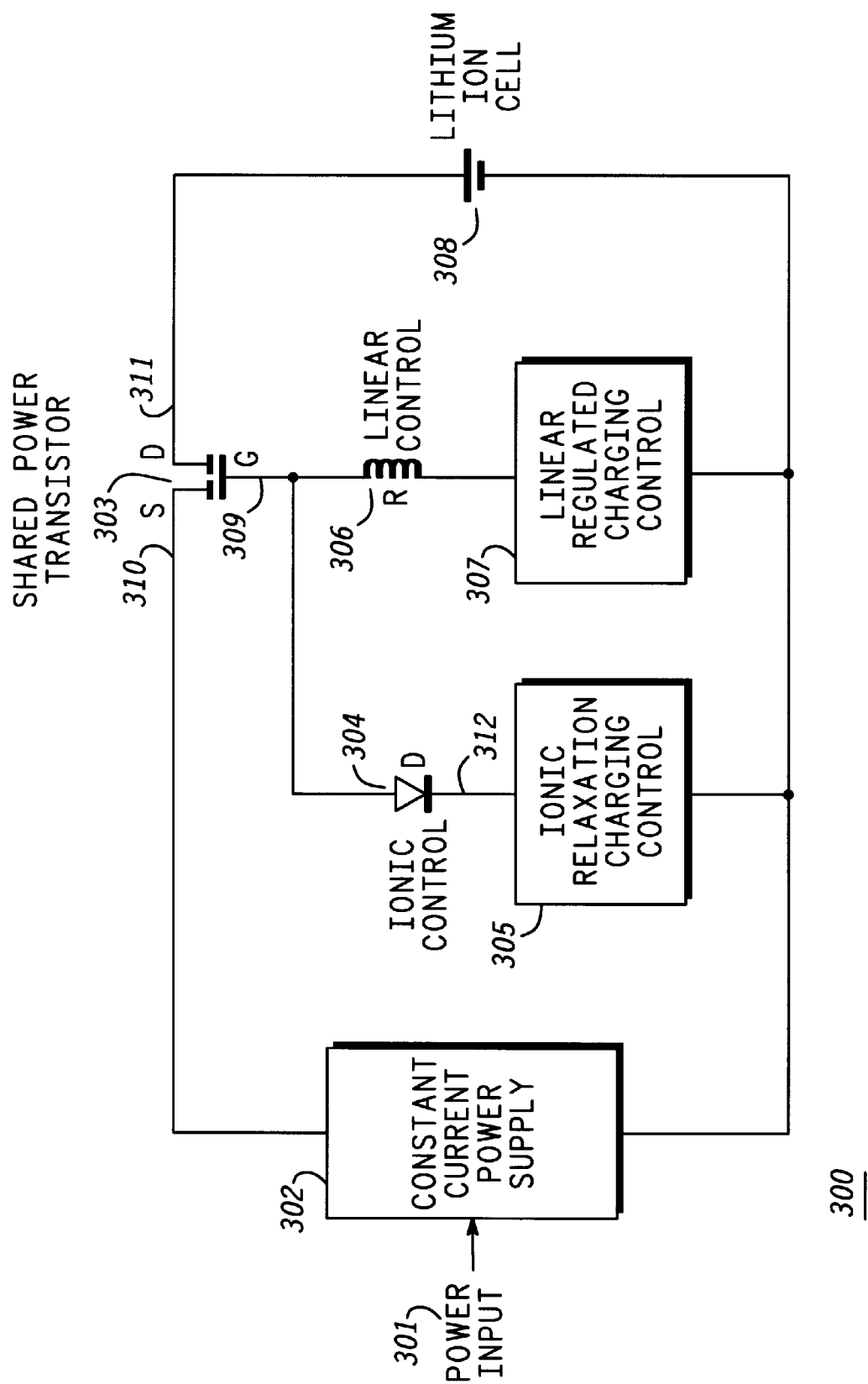
FIG. 4 illustrates a preferred embodiment of the invention.

The preferred embodiment of the present invention is shown in FIG. 4. Shown is an ionic relaxation charging system 300 comprising of a constant current power supply 302 with a power input 301, a shared power transistor 303 having a gate 309, a drain 311, and source 310, a blocking diode 304, ionic relaxation charging control 305, linear regulated charging control 307, a linear control series resistor 306 and a lithium ion cell 308. The system 300 works as does the one in FIG. 3 200. When the lithium ion cell 308 is below the termination voltage, the ionic relaxation charging control 305 works as described in relation to FIGS. 2 and 3. When the termination voltage is reached, the linear regulated charging control 307 takes over to top-off the battery.

The multiplexing takes place through the action of the blocking diode 304 and series resistor 306. The shared power transistor 303 is generally either a PNP bipolar or P-channel MOSFET. This means that when the gate 309 is at a voltage equivalent to the source 310, the shared power transistor 303 is open, or OFF. When the potential at the gate 309 is below the potential at the source 310, the power transistor 303 turns ON.

Knowing this, one can see how the multiplexing action takes place. It is clear how the power transistor 303 can be controlled by the linear regulated charging control 307 through the series resistor 306 in a conventional manner. The ionic relaxation control 305 is able to override the linear regulation charging control 307 through the blocking diode 304. When the ionic control logic signal 312 is high, the blocking diode 304 is reverse-biased and the linear regulated control 307 operates the shared power transistor 303. When the ionic control logic signal 312 is low, this signal dominates the gate 309 of the shared power transistor 303 and the ionic control signal 312 turns the shared power transistor 303 on.

The advantage of FIG. 4 is that a single power transistor can be used for both linear charging and ionic relaxation charging. This allows for a low cost, rapid charger capable of charging lithium ion cells to 100% of capacity.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the claims at the end of the specification. For example, while the invention has been cast as employing a P-type FET as a pass element, an analogous N-type FET would work equally as well. Additionally, bipolar transistors, including either a NPN transistor or a PNP transistor, would also suffice.

What is claimed is:

1. A battery charging system, comprising:
    A) a power supply having a power input, wherein the power supply is capable of delivering a constant current output;
    B) A lithium based rechargeable battery cell having a termination voltage;
    C) A linear regulated charging circuit coupled in series between the power supply and the lithium based rechargeable battery cell, wherein the linear regulated charging circuit provides a constant and limited value of charging current until the termination voltage of the lithium based rechargeable battery cell is reached, wherein the linear regulated charging control regulates at the value of the termination voltage;
    D) A power switch having a control terminal coupled in parallel with the linear regulated charging control circuit;
    E) An upper voltage reference and a lower voltage reference; and
    F) An ionic relaxation charging control circuit coupled to the control terminal of the power switch wherein the ionic relaxation control circuit closes the power switch when the voltage of the lithium based rechargeable battery cell is below the lower voltage reference and opens the power switch when the voltage of the lithium based rechargeable battery cell is above the upper voltage reference.

2. A battery charger as described in claim 1 wherein the ionic relaxation charging control circuit further comprises a delay circuit for maintaining a minimum time for the power switch to be open.

3. A battery charger as described in claim 2 wherein the power switch comprises a PNP Bipolar Transistor.

4. A battery charger as described in claim 2 wherein the power switch comprises a P-type MOSFET.

5. A battery charging system, comprising:
    A) a power supply having a power input, wherein the power supply is capable of delivering a constant current output;
    B) A lithium based rechargeable battery cell having a termination voltage;
    C) A single power switch having a control terminal coupled in series between the power supply and the lithium based rechargeable battery cell;
    D) A linear regulated charging control circuit to the control terminal of the power switch, wherein the linear regulated charging control circuit provides control signal proportional to a constant and limited value of charging current until the termination voltage of the lithium based rechargeable battery cell is reached, wherein the linear regulated charging control produces a control signal corresponding to the value of the termination voltage;
    E) A resistor coupled in series between the linear regulated charging control circuit and the control terminal of the power switch;
    F) An upper voltage reference and a lower voltage reference; and
    G) An ionic relaxation charging control circuit coupled to the control terminal of the power switch wherein the ionic relaxation control circuit closes the power switch when the voltage of the lithium based rechargeable battery cell is below the lower voltage reference and opens the power switch when the voltage of the lithium based rechargeable battery cell is above the upper voltage reference; and
    H) A diode coupled in series between the control terminal of the power switch and the ionic relaxation charging control circuit, with the anode towards the control terminal of the power switch.

6. A battery charger as described in claim 5 wherein the ionic relaxation charging control circuit further comprises a delay circuit for maintaining a minimum time for the power switch to be open.

7. A battery charger as described in claim 6 wherein the power switch comprises a PNP Bipolar Transistor.

8. A battery charger as described in claim 6 wherein the power switch comprises a P-type MOSFET.

9. A method of charging a battery, the method comprising the following steps:
    A) charging the cell at a rapid current until an upper predetermined cell voltage is reached;
    B) reducing charging current;
    C) charging the cell at a low current, in a linear fashion until either the cell is fully charged or a lower predetermined cell voltage is reached; and
    D) repeating these steps until the cell is fully charged.

* * * * *